United States Patent
Lee

(10) Patent No.: US 8,916,280 B2
(45) Date of Patent: Dec. 23, 2014

(54) BATTERY PACK

(75) Inventor: Wonil Lee, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 339 days.

(21) Appl. No.: 13/283,840

(22) Filed: Oct. 28, 2011

(65) Prior Publication Data
US 2012/0141854 A1 Jun. 7, 2012

(30) Foreign Application Priority Data

Dec. 1, 2010 (KR) .................. 10-2010-0121325

(51) Int. Cl.
*H01M 2/10* (2006.01)

(52) U.S. Cl.
CPC .............. *H01M 2/1077* (2013.01); *Y02E 60/12* (2013.01)
USPC ......................................................... 429/99

(58) Field of Classification Search
None
See application file for complete search history.

(56) References Cited

U.S. PATENT DOCUMENTS

| | | | |
|---|---|---|---|
| 7,274,554 B2 | 9/2007 | Kang et al. | |
| 7,606,022 B2 | 10/2009 | Kim | |
| 7,630,742 B2 | 12/2009 | Park et al. | |
| 2007/0228741 A1* | 10/2007 | Park et al. | 292/163 |
| 2010/0165555 A1 | 7/2010 | Tobiyama et al. | |

FOREIGN PATENT DOCUMENTS

| | | |
|---|---|---|
| JP | 09171805 | 6/1997 |
| JP | 11-53063 | 2/1999 |
| JP | 2001015189 | 1/2001 |
| JP | 2004095328 | 3/2004 |
| JP | 2004095328 A * | 3/2004 |
| KR | 10-2007-0054386 | 5/2007 |
| KR | 10-2009-0013278 | 2/2009 |

OTHER PUBLICATIONS

Korean Notice of Allowance issued Nov. 12, 2012 in connection with Korean Patent Application Serial No. 10-2010-0121325 and Request for Entry of the Accompanying Office Action attached herewith.

* cited by examiner

*Primary Examiner* — Ula C. Ruddock
*Assistant Examiner* — Daniel Gatewood
(74) *Attorney, Agent, or Firm* — Robert E. Bushnell, Esq.

(57) ABSTRACT

A battery pack that can reduce manufacturing costs and simplify an assembly structure. The battery pack includes a first case having an inner space, at least one battery cell arranged in the inner space of the first case, a second case coupled to the first case to accommodate the battery cell, and a coupling part arranged inside the coupled first and second cases. The coupling part includes a handle part and a protrusion part that is integrally formed with the handle part and protrudes outward according to a movement of the handle part.

19 Claims, 6 Drawing Sheets

BATTERY PACK

CLAIM OF PRIORITY

This application makes reference to, incorporates the same herein, and claims all benefits accruing under 35 U.S.C. §119 from an application for BATTERY PACK earlier filed in the Korean Intellectual Property Office on 1 Dec. 2010 and there duly assigned Korean Patent Application No. 10-2010-0121325.

BACKGROUND OF THE INVENTION

1. Field of the Invention

Embodiment of the present inventions relate to a battery pack having a case having coupling parts to allow for attachment to an external device.

2. Description of the Related Art

A battery pack used in portable external electronic devices such as notebooks, personal digital assistants (PDAs), and camcorders includes a plurality of battery cells in the form of a package to overcome its capacity limitation.

Such a battery pack includes a first case, a second case coupled to the first case, a plurality of battery cells arranged in a space formed by the first and second cases, and a protective circuit module arranged at a side of the battery cells to control charging and discharging. Such battery packs are installed on external devices such as notebooks, PDAs, and camcorders to supply predetermined power to the external devices. However, what is needed is a battery case that can allow for attachment and detachment of the battery pack to an external device.

SUMMARY OF THE INVENTION

An aspect of the present invention provides a battery pack that can reduce manufacturing costs and simplify an assembly structure.

According to one aspect of the present invention, there is provided a battery pack that includes a first case coupled to a second case, a battery cell arranged within an inner space of the coupled first and second cases, a first coupling part arranged within the coupled first and second cases, wherein the first coupling part includes a handle part and a protrusion part that is integrally formed with the handle part and protrudes outward from the coupled first and second cases according to a movement of the handle part.

The first coupling part may also include a plurality of recesses in a region where the handle part contacts the second case, and the second case may include a plurality of protrusions that couple to the recesses. The number of the recesses may be greater than the number of the protrusions. A distance between the recesses of the handle part may be equal to a protrusion length of the protrusion part. The first coupling part may also include a moving part arranged between the handle part and the protrusion part. The moving part may include a hole in a region contacting the handle part and corresponding to the recess. The moving part may include at least one guide hole therein, and the second case comprises a guide protrusion coupled to the guide hole. A distance between positions of a center of the guide protrusion maximally moved within the guide hole of the moving part may be equal to a protrusion pitch of the protrusion part. The second case may include at least one guide therein to fix a position of the first coupling part.

The handle part may include a rough part at an upper portion thereof. The battery pack may also include a second coupling part at an opposite side of the coupled first and second cases to the first coupling part, wherein the second coupling part may include a handle part and a protrusion part that is coupled to the handle part and inserted in the second case according to a movement of the handle part. The protrusion part of the second coupling part may have a lower portion provided with a curved surface. The second coupling part may also include a fixing part connected to the handle part and the protrusion part and fixed to an inner portion of the second case and an elastic member arranged at a periphery of the fixing part. The elastic member may be compressed according to a movement of the handle part to horizontally apply an elastic force to the protrusion part. The elastic member may be a spring. The second case may include at least one guide therein to fix a position of the second coupling part.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Example embodiments of the present invention will now be described more fully hereinafter with reference to the accompanying drawings; however, they may be embodied in different forms and should not be construed as limited to the embodiments of the present invention set forth herein. Rather, these embodiments of the present invention are provided so that this disclosure will be thorough and complete, and will fully convey the scope of the invention to those skilled in the art.

Hereinafter, embodiments of the present invention will be described in detail with reference to the accompanying drawings.

Figure 1:
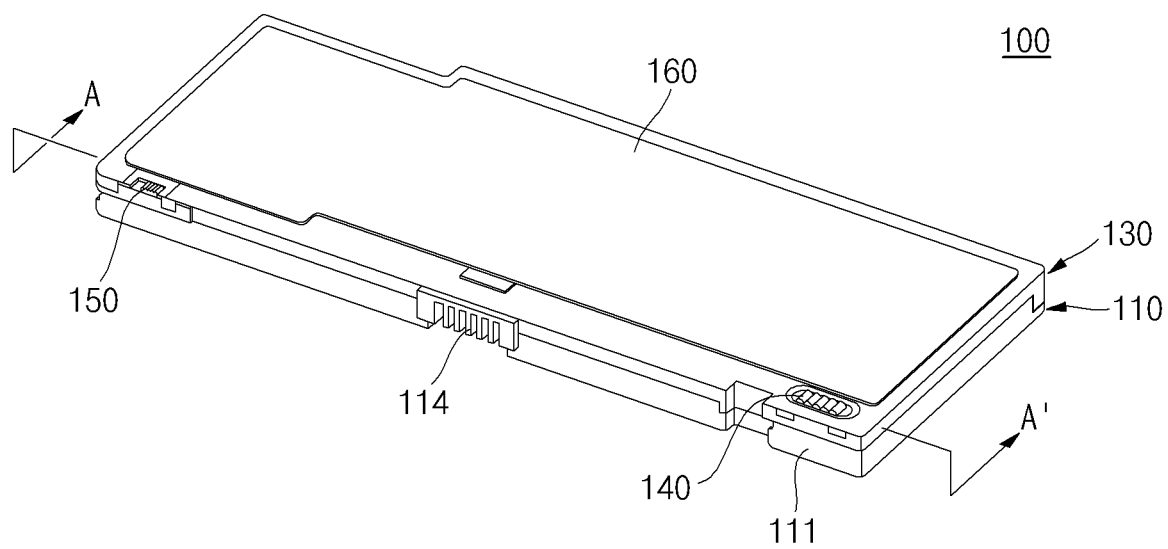
FIG. 1 is a perspective view illustrating a battery pack according to an embodiment of the present invention.
Figure 2:
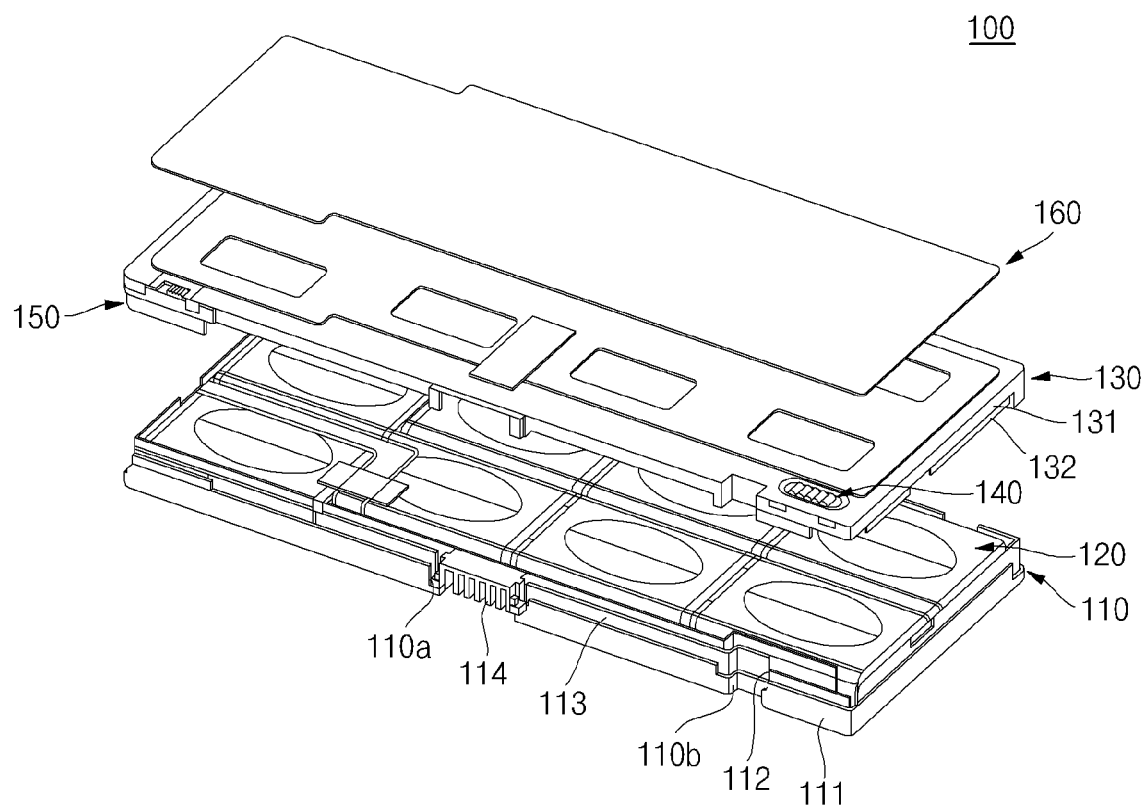
FIG. 2 is an exploded perspective view illustrating a battery pack according to an embodiment of the present invention.
Figure 3:
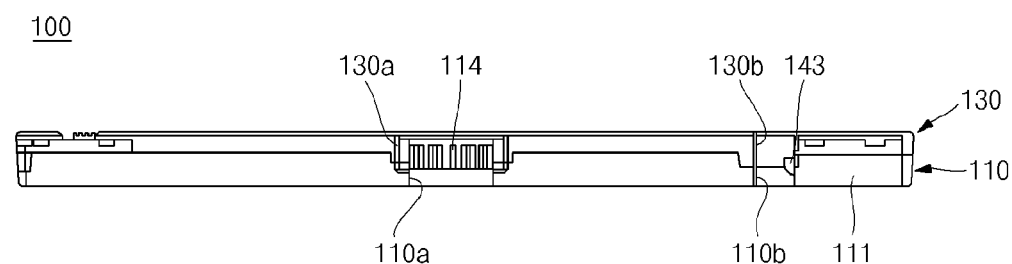
FIG. 3 is a front view illustrating a battery pack according to an embodiment of the present invention.
Figure 4:
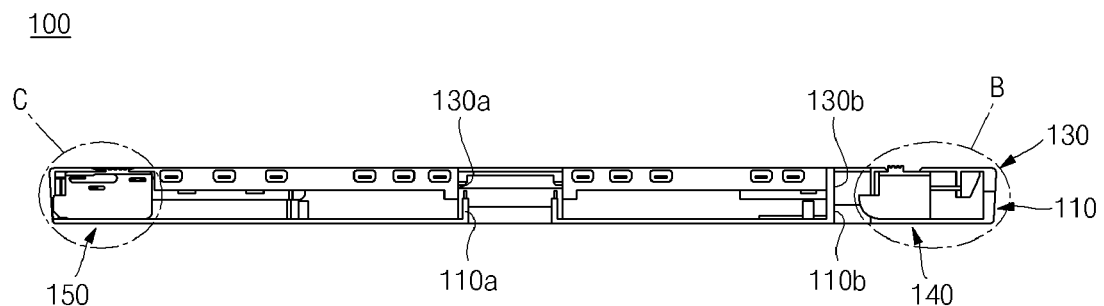
FIG. 4 is a cross-sectional view taken along line A-A' of FIG. 1.

Turning now to FIGS. 1 through 4, FIG. 1 is a perspective view illustrating a battery pack according to an embodiment of the present invention, FIG. 2 is an exploded perspective view illustrating a battery pack according to an embodiment of the present invention, FIG. 3 is a front view illustrating a battery pack according to an embodiment of the present invention and FIG. 4 is a cross-sectional view taken along line A-A' of FIG. 1.

Referring to FIGS. 1 through 4, a battery pack 100 according to an embodiment of the present invention may include a first case 110, a plurality of battery cells 120 arranged in the first case 110, a second case 130, a first coupling part 140, and a second coupling part 150. The battery pack 100 may further include a label 160.

The first case 110 has an approximately box shape with an open upper portion. The first case 110 has an inner space to accommodate the battery cells 120. The first case 110 and the second case 130 form an appearance of the battery pack 100 to maintain connections between the battery cells 120 and couple the battery cells 120 to an external device.

The first case 110 includes an outer wall 111 forming a periphery of the battery pack 100, an inner wall 112 arranged inside the outer wall 111 and spaced apart from the inner portion of the outer wall 111 to couple to the second case 130, a protective circuit module 113 arranged inside the outer wall 111 and connected to the battery cells 120, and a connector 114 connected to the protective circuit module 113.

The first case 110 includes a first recess 110a to expose connector 114 in a surface of the inner wall 112 corresponding to the surface of the outer wall 111. The connector 114 may be connected to the external device such as a notebook computer.

The first case 110 includes a second recess 110b through which the first coupling part 140 protrudes, and a third recess 110c through which the second coupling part 150 protrudes. Thus, the first and second coupling parts 140 and 150 arranged inside the outer wall 111 of the first case 110 are partially exposed through the second and third recesses 110b and 110c, respectively, and thus, can be physically coupled to an external device.

The battery cells 120 are arranged within the first case 110. The battery cells 120 may be provided in plurality to generate an output voltage required by the battery pack 100. The battery cells 120 are secondary batteries that are rechargeable, and each of the battery cells 120 may have, for example, a voltage of about 3.6 V. The battery cells 120 are exemplified as prismatic batteries, but the present disclosure is not limited thereto, and thus, may be exemplified as cylindrical batteries. In addition, the number of the battery cells 120 is eight in the current embodiment of the present invention, but the present invention is not limited thereto.

The second case 130 is coupled to the first case 110 to form a space for receiving the battery cells 120. To this end, the second case 130 may include an outer wall 131 forming a periphery of the battery pack 100, and an inner wall 132 arranged inside the outer wall 131 and inserted and coupled to the inner portion of the first case 110. The outer wall 131 has a shape corresponding to the outer wall 111 of the first case 110, and thus, engages with the first case 110. The inner wall 132 has a shape corresponding to a space between the outer wall 111 and the inner wall 112 of the first case 110, and thus, is inserted in the space and coupled to the first case 110. The inner wall 132 is coupled to the first case 110 to maintain the coupling of the second case 130 to the first case 110. In this arrangement, the inner wall 132 includes a guide protrusion 132a therein to function as a guide when the second coupling part 150 is coupled to an inner portion of the second case 130 and when the second coupling part 150 moves within the second case 130 to partially protrude from the second case 130. The coupling of the second case 130 and the second coupling part 150 will be described later in more detail in conjunction with FIGS. 8 through 11.

Figure 5:
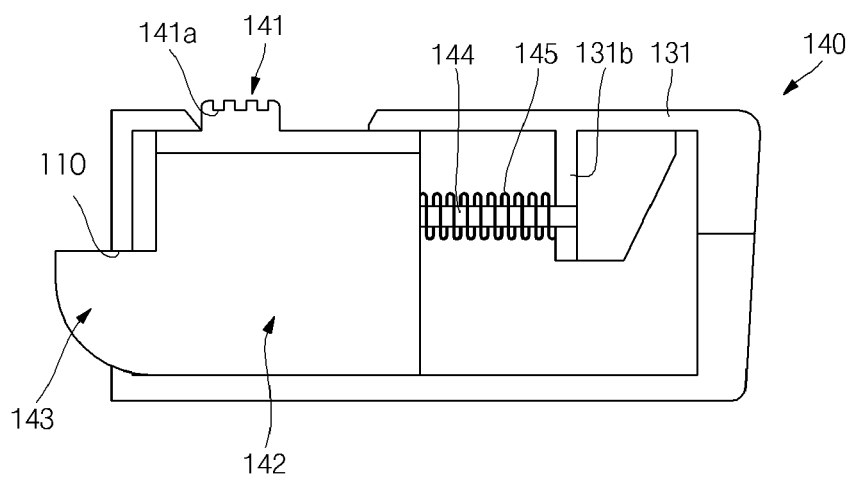
FIG. 5 is an enlarged view illustrating a region B of FIG. 4.
Figure 6:
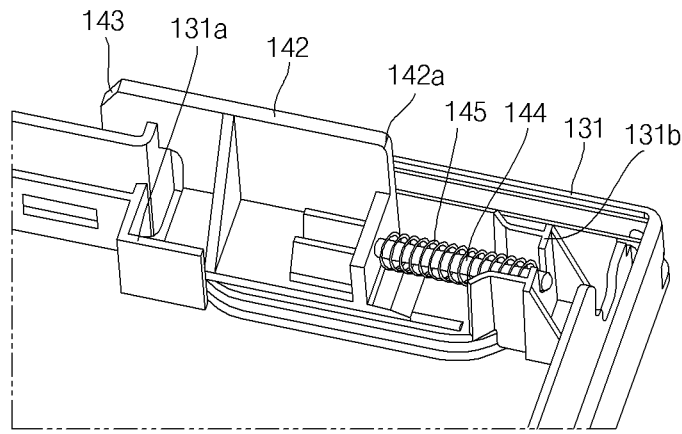
FIG. 6 is a perspective view illustrating a first coupling part of a battery pack according to an embodiment of the present invention.
Figure 7:
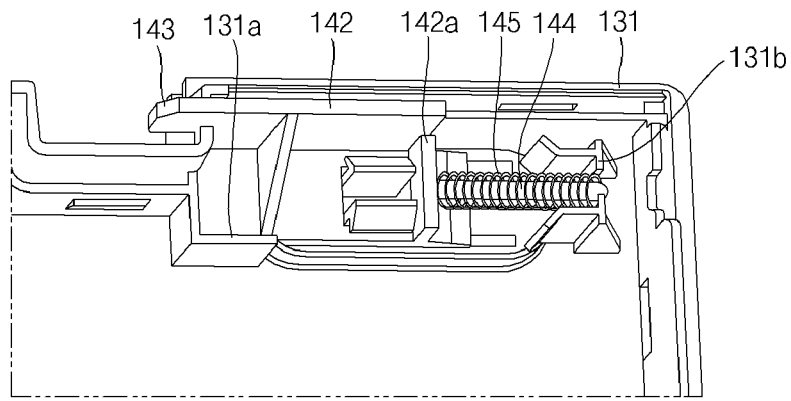
FIG. 7 is a perspective view illustrating a lower portion of a first coupling part of a battery pack according to an embodiment of the present invention.

A configuration of the first coupling part 140 will now be described with reference to FIGS. 5 through 7. Referring now to FIGS. 5 through 7, FIG. 5 is an enlarged view illustrating a region B of FIG. 4, FIG. 6 is a perspective view illustrating a first coupling part 140 of a battery pack according to an embodiment of the present invention and FIG. 7 is a perspective view illustrating a lower portion of a first coupling part 140 of a battery pack according to an embodiment of the present invention.

The first coupling part 140 is arranged within a portion of the second case 130. The first coupling part 140 may be arranged in a portion of a long side of four sides constituting the second case 130. The first coupling part 140 is arranged inside the outer wall 131 of the second case 130, and is fixed within the second case 130 by a guide 131a protruding from the outer wall 131.

The first coupling part 140 may include a handle part 141 exposed to the upper side of the second case 130, a moving part 142 perpendicular to the handle part 141 and coupled to an inner portion of the second case 130 and a protrusion part 143 protruding from an end of the moving part 142 to the second recess 110b of the first case 110 and inserted into the second recess 110b according to an operation of the handle part 141. First coupling part 140 may also include a fixing part 144 and an elastic member 145 to apply elastic force to the moving part 142.

The handle part 141 is a part to which force is transmitted by a user when attaching or removing the battery pack 100 to and from an external device. The handle part 141 may include a rough part 141a on the upper surface thereof to prevent a slip.

The moving part 142 is coupled approximately perpendicularly to the handle part 141. Specifically, referring to FIG. 7, the handle part 141 is coupled to the moving part 142 through a hook passing through the inside of the moving part 142. The moving part 142 moves within the second case 130 by applying a force to the handle part 141 or the fixing part 144.

The protrusion part 143 is coupled to one end of the moving part 142. The protrusion part 143 is arranged under the second case 130. In a normal state, the protrusion part 143 protrudes out through the second recess 110b of the first case 110. When a force is applied to the handle part 141 in the opposite direction to a protruding direction of the protrusion part 143, the protrusion part 143 is retracted back into the second recess 110b of the first case 110. When the force applied by the handle part 141 is removed, the protrusion part 143 protrudes again out from the second recess 110b of the first case 110 by the elastic force of the elastic member 145. Accordingly, the protrusion part 143 makes it easy to couple and uncouple the battery pack 100 to and from an external device. The battery pack 100 is securely coupled to the external device until a user applies force for uncoupling the battery pack 100.

The fixing part 144 is coupled to another end 142a of the moving part 142 opposite to that of the protrusion part 143. The fixing part 144 has a cylindrical shape, and extends in a moving direction of the protrusion part 143. The fixing part 144 passes through a second guide 131b protruding from the outer wall 131 of the second case 130. The second guide 131b has a hole with a diameter slightly greater than that of the fixing part 144, so that the fixing part 144 can pass through the hole.

The elastic member 145 is coupled to the periphery of the fixing part 144 in the longitudinal direction of the fixing part 144. The elastic member 145 applies the elastic force to the moving part 142 when the moving part 142 and the fixing part 144 are moved according to force applied by a user to the handle part 141. In the current embodiment of the present invention, the elastic member 145 is exemplified as a spring. When a user applies force to the handle part 141 and the moving part 142 is moved to the right, the elastic member 145 is compressed. In this case, the elastic member 145 cannot pass through the hole formed in the second guide 131b of the second case 130, and thus, the elastic member 145 is compressed. When the force applied by the user is removed by the user separating a finger from the handle part 141, the elastic force due to the compression is applied to the moving part 142 by the elastic member 145. Thus, the moving part 142 and the protrusion part 143 formed at the end thereof return their original positions, and the protrusion part 143 protrudes out of the second case 130 to maintain the coupling of the protrusion part 143 to an external device.

Figure 8:
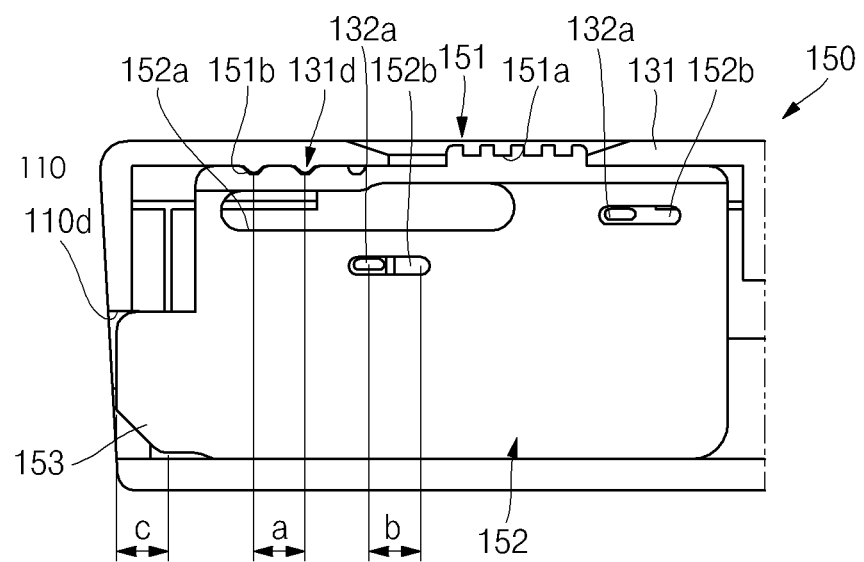
FIG. 8 is an enlarged view illustrating a region C of FIG. 4.
Figure 9:
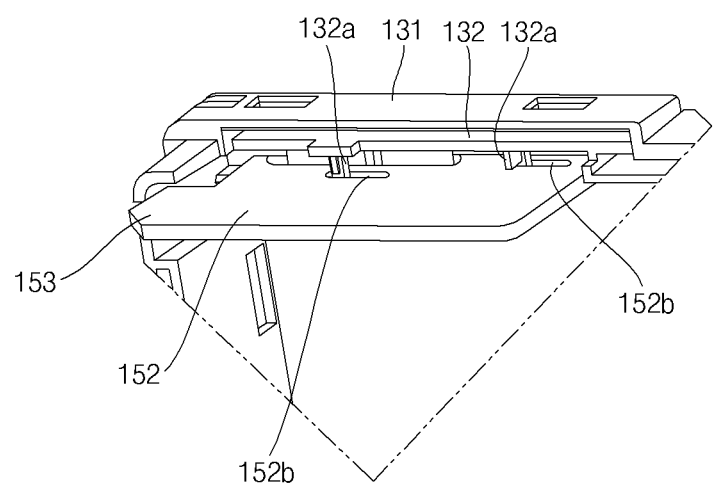
FIG. 9 is a perspective view illustrating a second coupling part of a battery pack according to an embodiment of the present invention.
Figure 10:
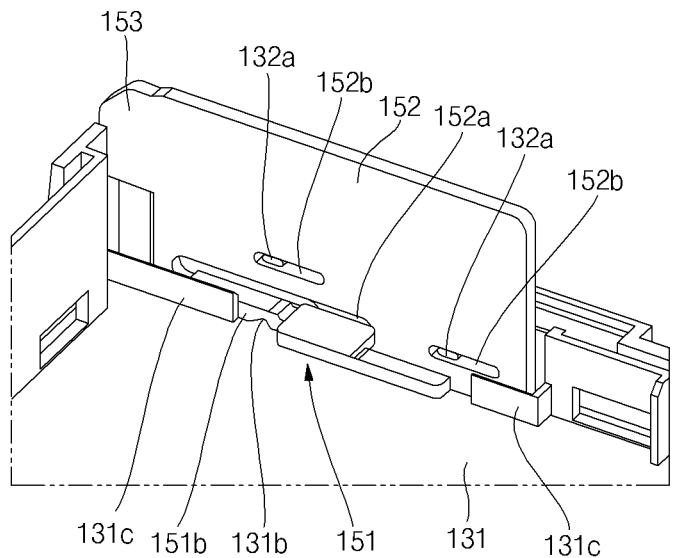
FIG. 10 is a perspective view illustrating a lower portion of a second coupling part of a battery pack according to an embodiment of the present invention.

A configuration of the second coupling part 150 will now be described with reference to FIGS. 8 through 10. Referring now to FIG. 8, FIG. 8 is an enlarged view illustrating a region C of FIG. 4, FIG. 9 is a perspective view illustrating a second coupling part 150 of a battery pack according to an embodiment of the present invention and FIG. 10 is a perspective view illustrating a lower portion of a second coupling part 150 of a battery pack according to an embodiment of the present invention.

The second coupling part 150 is arranged at an opposite side of the second case 130 from the first coupling part 140. The second coupling part 150 may be approximately symmetrical to the first coupling part 140 with respect to the center of the second case 130 in the longitudinal direction of the second case 130.

The second coupling part 150 is arranged inside the outer wall 131 of the second case 130, and is fixed to an inner portion of the second case 130 by protrusion 131d protruding from the outer wall 131.

The second coupling part 150 may include a handle part 151 partially exposed to the upper side of the second case 130, a moving part 152 perpendicular to the handle part 151 and coupled to an inner portion of the second case 130, and a protrusion part 153 arranged at an end of the moving part 152.

The handle part 151 is arranged inside the second case 130. The handle part 151 is a part to which force is transmitted by a user when attaching or removing the battery pack 100. The handle part 151 may include a rough part 151a to prevent a slip. The handle part 151 may include at least one recess 151b in a region where the handle part 151 contacts the outer wall 131 of the second case 130. The outer wall 131 includes at least one protrusion 131d for coupling to the recess 151b. The number of the recesses 151b may be greater by one than the number of the protrusions 131d. Each of the neighboring recesses 151b and each of the neighboring protrusions 131d are spaced apart from each other by distance "a", making distance 'a' a pitch of the protrusions 131d and the recesses 151b. When the handle part 151 horizontally moves, and the recess 151b of the handle part 151 moves, the recesses 151b are moved accurately by a distance 'a' between the protrusions 131d. Accordingly, a user perceives a horizontal movement of the second coupling part 150 through a vibration due to coupling of the protrusion 131d and the recess 151b. Since the protrusion 131d is coupled to the recess 151b to fix the handle part 151, the protrusion part 153 of the second coupling part 150 is fixed, so that the battery pack 100 can be stably coupled to and uncoupled from an external device.

The moving part 152 is coupled to the handle part 151. The moving part 152 protrudes from the opposite surface of the handle part 151 than the rough part 151a of the handle part 151. The moving part 152 is integrally formed with the handle part 151. When force is applied to the handle part 151, the moving part 152 is moved together with the handle part 151 to horizontally move the protrusion part 153.

The moving part 152 has a buffer hole 152a at the lower side of the recess 151b in a region where the moving part 152 contacts the handle part 151. The buffer hole 152a provides a space for allowing a vertical movement of the handle part 151 when the recess 151b of the handle part 151 is coupled to the protrusion 131d of the second case 130 according to a movement of the handle part 151. Thus, when the handle part 151 moves, the handle part 151 is slightly compresses the buffer hole 152a. In addition, when the recess 151b is coupled to the protrusion 131d, the handle part 151 returns to its original shape using elastic force, thereby preventing a deformation of the handle part 151.

The moving part 152 has guide holes 152b for fixing a coupling position between the second coupling part 150 and the second case 130. Protrusions 132a perpendicular to the inner wall 132 of the second case 130 pass through the guide holes 152b. The protrusions 132a limit a horizontal movement of the guide holes 152b. Thus, the maximum movement distance of the moving part 152 is equal to a distance 'b' between the centers of positions where the protrusion 132a is arranged at both ends of the guide hole 152b. The distance 'b' is equal to the distance 'a' between the recesses 151b.

The protrusion part 153 is arranged at an end of the moving part 152. The end of the moving part 152 provided with the protrusion part 153 is arranged at the outside of the second case 130. The protrusion part 153 arranged at the end of the moving part 152 is arranged under the second case 130, and thus, can protrude out through opening 110c of the first case 110. When the battery pack 100 is removed from an external device, the protrusion part 153 is retracted within opening 110c of the first case 110. When the battery pack 100 is coupled to an external device, the protrusion part 153 protrudes out of opening 110c and is inserted into the external device, so that the battery pack 100 can be coupled to the external device. In this case, a protrusion length of the protrusion part 153 'c' is equal to the distance 'a' between the recesses 151b of the handle part 151, and the distance 'b' between the centers of the positions where the protrusion 132a is arranged at both the ends of the guide hole 152b.

The handle part 151, the moving part 152, and the protrusion part 153, which constitute the second coupling part 150, are integrally formed with one another. That is, since the second coupling part 150 may be formed using just one mold, mold costs can be reduced, thereby reducing manufacturing costs. Accordingly, the second coupling part 150 has an integral structure, that is, a simple structure, and thus, is physically reinforced.

Hereinafter, a configuration that the protrusion part 153 of the second coupling part 150 protrudes and is connected to an external device will now be described.

Figure 11:
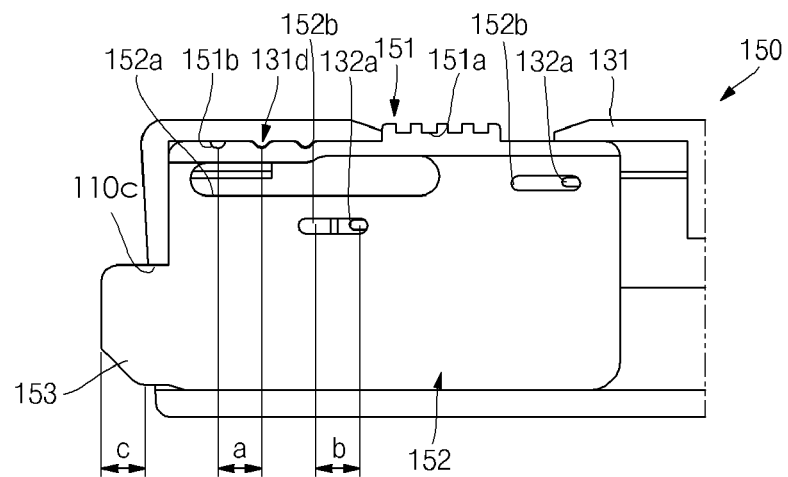
FIG. 11 is a cross-sectional view illustrating a state where a second coupling part of a battery pack protrudes, according to an embodiment of the present invention.

Turning now to FIG. 11, FIG. 11 is a cross-sectional view illustrating a state where a second coupling part 150 of a battery pack protrudes out of opening 110c of battery pack 100, according to an embodiment of the present invention. Referring now to FIG. 11, the handle part 151 moves left through the distance 'a' between the recesses 151b, and the second coupling part 150 is coupled to the protrusion 131d of the second case 130. Accordingly, the moving part 152 moves along the guide holes 152b, and the protrusions 132a of the second case 130 relatively move right through the distance 'b' from their original positions. Accordingly, the protrusion part 153 moves through a distance 'c' that is equal to the distance 'a' between the recesses 151b and the distance 'b' of the protrusions 132a, and thus, protrudes out of the first case 110. Thus, the protrusion part 153 can be coupled to an external device, and the coupling between the battery pack 100 and the external device can be maintained.

The label 160 may be attached to the upper portion of the second case 130. The label 160 may display information about the battery pack 100.

Since the battery pack according to the embodiment of the present invention includes the integral coupling part for coupling the case, mold costs can be reduced, thereby reducing manufacturing costs.

Since the battery pack according to the embodiment of the present invention includes the integral coupling part for coupling the case, the coupling part has a simple structure, and thus, is physically reinforced.

Exemplary embodiment of the present inventions have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery pack, comprising:
   a first case coupled to a second case;
   a battery cell arranged within an inner space of the coupled first and second cases;
   a first coupling part arranged within the coupled first and second cases,
   wherein the first coupling part includes a handle part and a protrusion part that is integrally formed with the handle part and protrudes outward from the coupled first and second cases according to a movement of the handle part, wherein the first coupling part further comprises a plurality of recesses in a region where the handle part contacts the second case, and the second case comprises a plurality of protrusions that couple with the recesses, wherein the plurality of protrusions cam with the plurality of recesses upon movement of the handle part with respect to the first and second cases to allow the handle part and the protrusion part to move at discrete intervals with respect to the first and second cases.

2. The battery pack of claim 1, wherein the number of the recesses is greater than the number of the protrusions.

3. The battery pack of claim 1, wherein a distance between neighboring recesses of the handle part is equal to a distance between neighboring protrusions of the second case.

4. The battery pack of claim 1, wherein the first coupling part further comprises a moving part arranged between the handle part and the protrusion part.

5. The battery pack of claim 4, wherein the moving part comprises an aperture at a location adjacent to the recesses in the handle part to provide an elastic force to the handle part and prevent deformation of the handle part when the handle part and the recesses move with respect to and slide upon the protrusions of the second case.

6. The battery pack of claim 4, wherein the moving part comprises at least one guide hole therein, and the second case comprises a guide protrusion coupled to the guide hole.

7. A battery pack, comprising:
   a first case coupled to a second case;
   a battery cell arranged within an inner space of the coupled first and second cases;
   a first coupling part arranged within the coupled first and second cases, wherein the first coupling part includes a handle part and a protrusion part that is integrally formed with the handle part and protrudes outward from the coupled first and second cases according to a movement of the handle part, wherein the first coupling part further comprises a plurality of recesses in a region where the handle part contacts the second case, and the second case comprises a plurality of protrusions that couple to the recesses, wherein the first coupling part further comprises a moving part arranged between the handle part and the protrusion part, wherein the moving part comprises at least one guide hole therein, and the second case comprises a guide protrusion coupled to the guide hole, and wherein a distance between positions of a center of the guide protrusion maximally moved within the guide hole of the moving part is equal to a protrusion pitch of the protrusion part.

8. The battery pack of claim 6, wherein the second case comprises at least one guide therein to fix a position of the first coupling part.

9. The battery pack of claim 1, the handle part being a part to which force is transmitted to the first coupling part by a user when attaching or removing the battery pack from an electronic device, wherein the handle part comprises a rough part at an upper portion thereof to prevent slip by the user, wherein the plurality of recesses are distinguished from and spaced-apart from the rough part.

10. The battery pack of claim 1, further comprising a second coupling part spaced apart from and arranged at an opposite end of the coupled first and second cases than the first coupling part,
    wherein the second coupling part to engage and disengage the battery pack with an electronic device, and
    wherein the second coupling part includes a handle part and a protrusion part that is coupled to the handle part and can either protrude from or be inserted within the second case according to a movement of the handle part.

11. The battery pack of claim 10, wherein the protrusion part of the second coupling part has a lower portion provided with a curved surface.

12. The battery pack of claim 10, wherein the second coupling part further comprises:
    a fixing part connected to the handle part and the protrusion part and fixed to an inner portion of the second case; and
    an elastic member arranged at a periphery of the fixing part.

13. The battery pack of claim 12, wherein the elastic member is compressed according to a movement of the handle part to horizontally apply an elastic force to the protrusion part.

14. The battery pack of claim 12, wherein the elastic member comprises a spring.

15. The battery pack of claim 10, wherein the second case comprises at least one guide therein to fix a position of the second coupling part.

16. The battery pack of claim 10, wherein the second coupling part comprises a spring and the first coupling part is absent of a spring, the second coupling part moves upon application of a force by a user to the handle part of the second coupling part to compress the spring, wherein the first coupling part moves upon application of a force by the user to the handle part of the first coupling part to cause the recesses in the handle part to slide with respect to the protrusions of the second case.

17. A battery pack, comprising:
    a first case coupled to a second case;
    a battery cell arranged within an inner space of the coupled first and second cases;
    a first coupling part and a second coupling part arranged within the coupled first and second cases, the second coupling part being spaced apart from the first coupling part, the first and second coupling parts to attach and detach the battery pack to and from an electronic device,
wherein the first coupling part includes a handle part and a protrusion part that is integrally formed with the handle part and protrudes outward from the coupled first and second cases according to a movement of the handle part, the handle part comprising a rough part to allow a user to grip and move the handle part, the handle part further comprising a plurality of recesses spaced apart from the rough part, the recesses to engage with a plurality of protrusions arranged on an inner side of the second case, the plurality of recesses sliding over the plurality of protrusions upon movement of the handle.

18. The battery pack of claim 17, the second coupling part including a handle part and a protrusion part, the second coupling part further including a spring that provides a compressive force, wherein the second coupling part moves by a user moving the handle part against the compressive force of the spring, the first coupling part being absent of a spring.

19. The battery pack of claim 18, wherein a pitch between neighboring ones of the recesses is equal to a pitch between neighboring ones of the protrusions to allow the handle part of the first coupling part to move at discrete intervals.

\* \* \* \* \*